United States Patent

Lutz

[15] 3,684,940

[45] Aug. 15, 1972

[54] POWER AMPLIFIER HAVING SOURCE OF DIFFERENT POWER CAPABILITIES FOR ENERGIZING A SERVO MOTOR

[72] Inventor: Fritz Norman Lutz, Northfield, Ohio

[73] Assignee: The Warner & Swasey Company, Cleveland, Ohio

[22] Filed: April 9, 1970

[21] Appl. No.: 27,008

[52] U.S. Cl. ....................318/635, 318/345, 318/681

[51] Int. Cl. ..............................................G05b 11/01

[58] Field of Search......318/342, 592, 597, 345, 341, 318/635, 678, 681

[56] References Cited

UNITED STATES PATENTS

| | | | |
|---|---|---|---|
| 3,422,330 | 1/1969 | Swanke | 318/345 X |
| 3,445,739 | 5/1969 | Martz | 318/341 X |
| 3,548,278 | 12/1970 | Sommeria | 318/345 X |
| 2,534,207 | 12/1950 | Picking et al. | 318/342 X |
| 3,372,333 | 3/1968 | Esch | 318/592 X |

*Primary Examiner*—Benjamin Dobeck
*Attorney*—Yount and Tarolli

[57] ABSTRACT

A control system for a direct-current servo motor drive amplifier which changes the magnitude of the voltage supplied to the amplifier according to the magnitude of the input signal to the amplifier in order to reduce the power loss in the amplifier and thereby permit the use of lower rated components, for example, transistors. The amplifier input signal is supplied to a plurality of operational amplifiers in a level-detecting circuit that operates to selectively connect a plurality of voltage sources to supply the voltage requirements of the drive amplifier in accordance with the magnitude of the input signal. An embodiment of the voltage-switching circuit employing controlled rectifiers and an embodiment employing transistors are disclosed.

20 Claims, 5 Drawing Figures

INVENTOR
FRITZ NORMAN LUTZ

BY Yount and Tarolli
ATTORNEYS

INVENTOR
FRITZ NORMAN LUTZ
BY Yount and Tarolli
ATTORNEYS

INVENTOR
FRITZ NORMAN LUTZ
BY Yount and Tarolli
ATTORNEYS

POWER AMPLIFIER HAVING SOURCE OF DIFFERENT POWER CAPABILITIES FOR ENERGIZING A SERVO MOTOR

One commonly used servo drive amplifier is the phase controlled amplifier, which may be either full-wave or half-wave. With this type of amplifier there is an inherent response delay and the driving energy to the servo motor armature is a pulse, the width of which determines the average energy which is supplied to the armature. As a result there are excessive armature losses in the servo motor, larger servo motors are required, and external cooling may also be required in some applications. High accelerations, resulting from the steep wave fronts of the phase controlled excitation wave form, may require a heavier gear train or other load connecting device than would otherwise be required.

Polyphase phase-controlled systems have been employed in an attempt to overcome the problems associated with the single-phase phase-controlled servo drive amplifier. However, polyphase systems are more complex and costly than single phase systems. Another solution is to use a DC amplifier. However, prior DC amplifiers have exhibited excessive power losses, a characteristic that has greatly restricted their use. The power control system of the disclosed invention overcomes this undesirable feature by providing a DC amplifier in which the power loss occurring in the amplifier is substantially reduced.

The disclosed power control system is particularly useful in applications where a servo motor controlled by an error signal moves a slide, screw, or other member to a desired location. As the movable member approaches the desired location, the error signal becomes smaller to slow the movement of the member and less power is required from the amplifier. As is well known in the art, maximum power dissipation will occur in the amplifier when the resistance of the amplifier is equal to the resistance of the load. In order to avoid operating near this condition, the disclosed system switches the supply voltage of the servo drive amplifier to a lower magnitude so that the power dissipation in the amplifier is kept low as the error signal is reduced.

The DC servo drive amplifier of the disclosed invention, unlike a phase-controlled amplifier, does not have a significant inherent response delay. A lower power loss results in the armature of the direct current servo motor than occurs with a phase-controlled servo drive amplifier because of the improved form factor of the driving current. Also the high peak accelerations which occur in phase-controlled servo drive systems as a result of the steep wave fronts in the driving current are eliminated by the amplifier and control system of the disclosed invention without sacrificing performance.

It is an object of the present invention to provide a power control system for a DC amplifier for supplying driving current to a load circuit under the control of an input signal which controls the supply voltage connected to the amplifier as a function of the magnitude of the input signal.

It is another object of the present invention to provide a power control system for a servo motor drive amplifier wherein the servo motor drives a load under the control of an error signal that controls the power capability of the amplifier, preferably by controlling the supply voltage to the amplifier as a function of the magnitude of the error signal.

Other objects and aspects of the present invention will be apparent from the following description as illustrated in the drawings in which.

Figure 1:
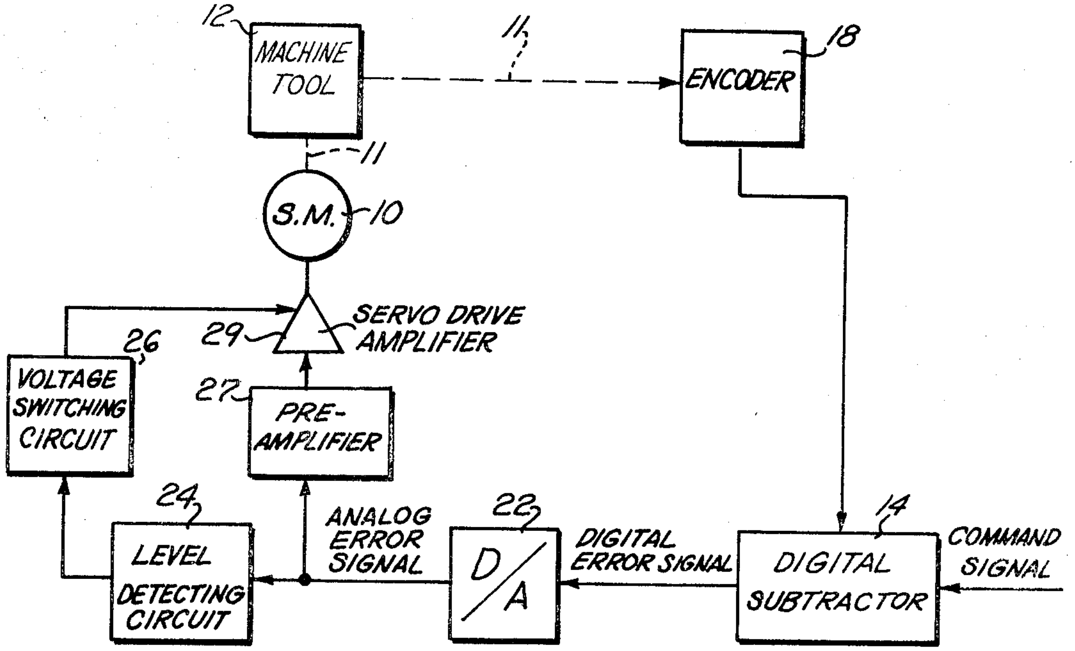
FIG. 1 is a block diagram of a machine tool servo drive embodying the power control system of the present invention.

An overall understanding of the power control system of the present invention is gained by reference to FIG. 1 in which a servo motor 10 is coupled through a lead screw or other coupling means (indicated by the dotted line 11) to drive a moving member (not shown) in the machine tool 12 which performs a desired task. The servo motor 10 may drive the moving member in one of two directions, according to its direction of rotation, in order to drive the moving member to a desired location or into a desired state. A conventional encoding device 18, which is coupled to the machine tool 12, produces digital signals that represent the location of the moving member and these signals are coupled to a digital subtractor 14. A digital command signal from a command generator (not shown) indicates the desired position of the moving member. The digital subtractor 14 produces a difference or error signal in digital form. The digital error signal from digital subtractor 14 is coupled to a digital-to-analog converter 22 which produces an analog error signal.

The analog error signal from the digital-to-analog converter 22 is coupled to an amplifier control circuit 27 and a level-detecting circuit 24, and the level-detecting circuit 24 is coupled to a voltage switching circuit 26. The amplifier control circuit 27 provides control signals to the servo motor drive amplifier 29, and the voltage switching circuit 26 switches different supply voltages to the servo drive amplifier 29 as a function of the magnitude of the error signal from the converter 22.

When the magnitude of the analog error signal reaches certain predetermined levels the level-detecting circuit 24 produces switching signals corresponding to ranges of levels of the analog error signal. The switching signals from the level-detecting circuit 24 are, therefore, quantized with respect to the magnitude of the analog error signal, and these quantized signals control the voltage switching circuit 26.

Figure 2:
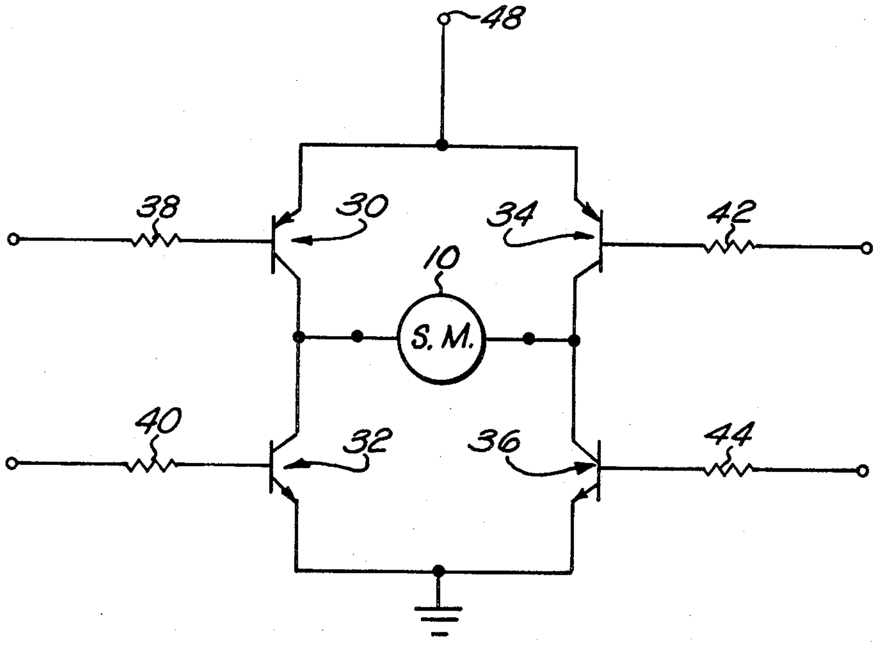
FIG. 2 is a schematic diagram of a servo drive amplifier which is employed in the power control system of FIG. 1.

FIG. 2 shows a schematic diagram of servo drive amplifier 29 wherein transistors 30 and 36 and transistors 32 and 34 conduct current in pairs, respectively, to control the magnitude and polarity of the driving current to the servo motor 10, thereby controlling the direction of rotation and torque of the servo motor. The transistors 30, 32, 34, and 36 may each comprise a number of parallel coupled transistors depending upon the power requirements of the load. The supply voltage for the transistors 30, 32, 34, and 36 is applied between terminal 48 and ground. When it is desired that the servo motor 10 rotate in one direction, the PNP transistor 34 and the NPN transistor 32 will both be biased to conduct current and the PNP transistor 30 and the NPN transistor 36 will both be biased to cutoff. When it is desired that the motor rotate in the opposite direction, the transistors 30 and 36 will both be biased to conduct current and the transistors 32 and 34 will both be biased to cutoff. Transistors 30, 32, 34, and 36 may be any combination of NPN and PNP transistors.

Base resistors 38, 40, 42, and 44 are connected, respectively, between the bases of transistors 30, 32, 34, and 36 and a conventional preamplifier 27 which supplies base bias voltages to the transistors 30 through 36 according to the type of transistors used and the magnitude and polarity of the analog error signal.

Figure 3:
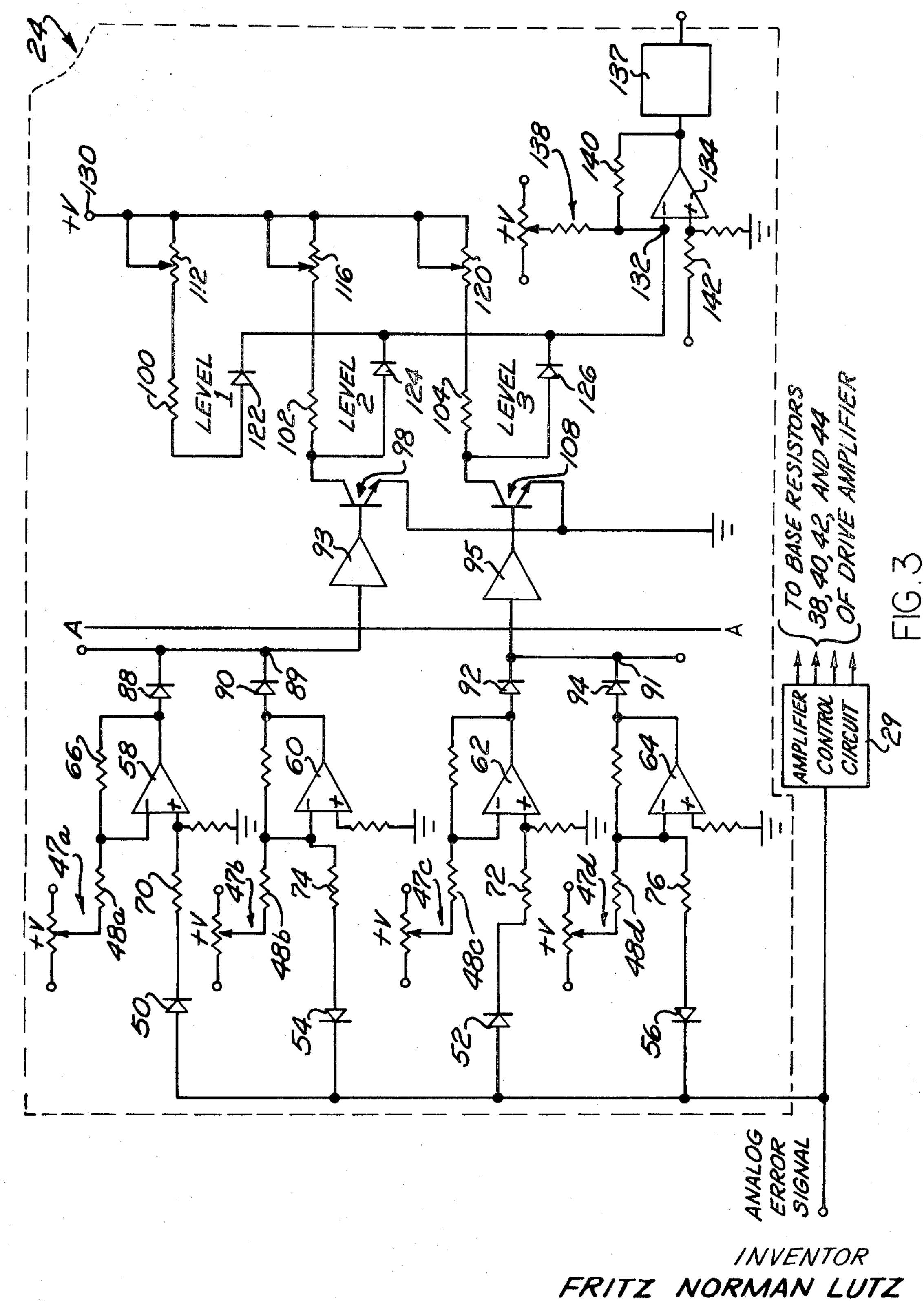
FIG. 3 is a schematic diagram of the level-detecting circuit of the power control system of FIG. 1.

The analog error signal from the converter 22 that is coupled to pre-amplifier 27 is also coupled to the level-detecting circuit 24 which is shown in schematic form in FIG. 3. Positive polarity analog error signals are coupled through diodes 50 and 52 and input resistors 70 and 72 to the noninverting terminals of operational amplifiers 58 and 62 respectively. Therefore, amplifiers 58 and 62 are responsive to positive polarity analog error signals and unresponsive to negative polarity analog error signals. Negative polarity analog error signals are coupled through diodes 54 and 56 and input resistors 74 and 76 to the inverting terminals of operational amplifiers 60 and 64 respectively. Therefore, amplifiers 60 and 64 are responsive to negative polarity analog error signals and unresponsive to positive polarity analog error signals.

The operational amplifiers 58, 60, 62, and 64 each may have a feedback resistor coupled between its respective output and inverting input terminal, such as, for example, the feedback resistor 66 associated with the operational amplifier 58. An adjustable bias voltage source 47 is also coupled to the inverting input of each of the operational amplifiers 58, 60, 62, and 64 through resistors 48, such as the voltage-dividing circuit 47*a*, for example, which is coupled to the amplifier 58 through resistor 48*a*.

The values of resistors 66, 47, and 48 are selected so that a very small input signal will drive the output levels of operational amplifiers 58, 60, 62, and 64 to either positive or negative saturation. Thus, operational amplifiers 58 and 62 will produce a positively saturated output signal whenever the analog error signal is of positive polarity and has a magnitude exceeding the bias level for the respective amplifier. For other values of the analog error signal, the outputs of amplifiers 58 and 62 will be at negative saturation. The voltage-dividing circuit 47*a* which is associated with the operational amplifier 58, for example, is set to a lower level than is the voltage-dividing circuit 47*c* that is associated with the operational amplifier 62. Thus, as a positive polarity analog error signal increases in magnitude, the first quantized level that is reached is determined by the voltage-dividing circuit 47*a* which is coupled to the operational amplifier 58. A second quantized level for a positive polarity analog error signal is determined by the voltage-dividing circuit 47*c* which is coupled to the amplifier 62.

Similarly, a first quantized level signal for a negative polarity analog error signal is produced at the output of operational amplifier 60 and the error signal level at which it occurs is determined by the setting of the voltage-dividing circuit 47*b*. The second quantized level for a negative polarity analog error signal is produced at the output of operational amplifier 64 and the error signal level at which it occurs is set by the voltage-dividing circuit 47*b*. For negative polarity error signals below their respective bias settings, the outputs of amplifiers 60 and 64 are at negative saturation.

The output of the operational amplifier 58 will be at positive saturation whenever an analog error signal of positive polarity exceeds the first quantized level since the input resistor 70 is coupled to the noninverting input terminal of the operational amplifier 58. Similarly, because the input resistor 74 is coupled to the inverting input terminal of operational amplifier 60, the output of operational amplifier 60 will be at positive saturation whenever an analog error signal of negative polarity exceeds the first quantized level. The outputs of the amplifiers 58 and 60 are coupled to the junction point 89 through diodes 88 and 90, which are poled in a like manner. Therefore, the signal which appears at junction point 89 will be of positive polarity whenever the magnitude of the analog error signal exceeds the first quantized level regardless of the polarity of the error signal. The outputs of the amplifiers 62 and 64 are similarly coupled to a junction point 91 through diodes 92 and 94. The signal which appears at junction point 91 will also be at a positive potential whenever the magnitude of an analog error signal of either polarity exceeds the second quantized level. Thus, the circuit of FIG. 3 to the left of line A—A is substantially an analog to digital converter. The signals which appear at junctions 89 and 91 are the switching signals earlier referred to that control switching circuit 26.

Figures 4, 5:
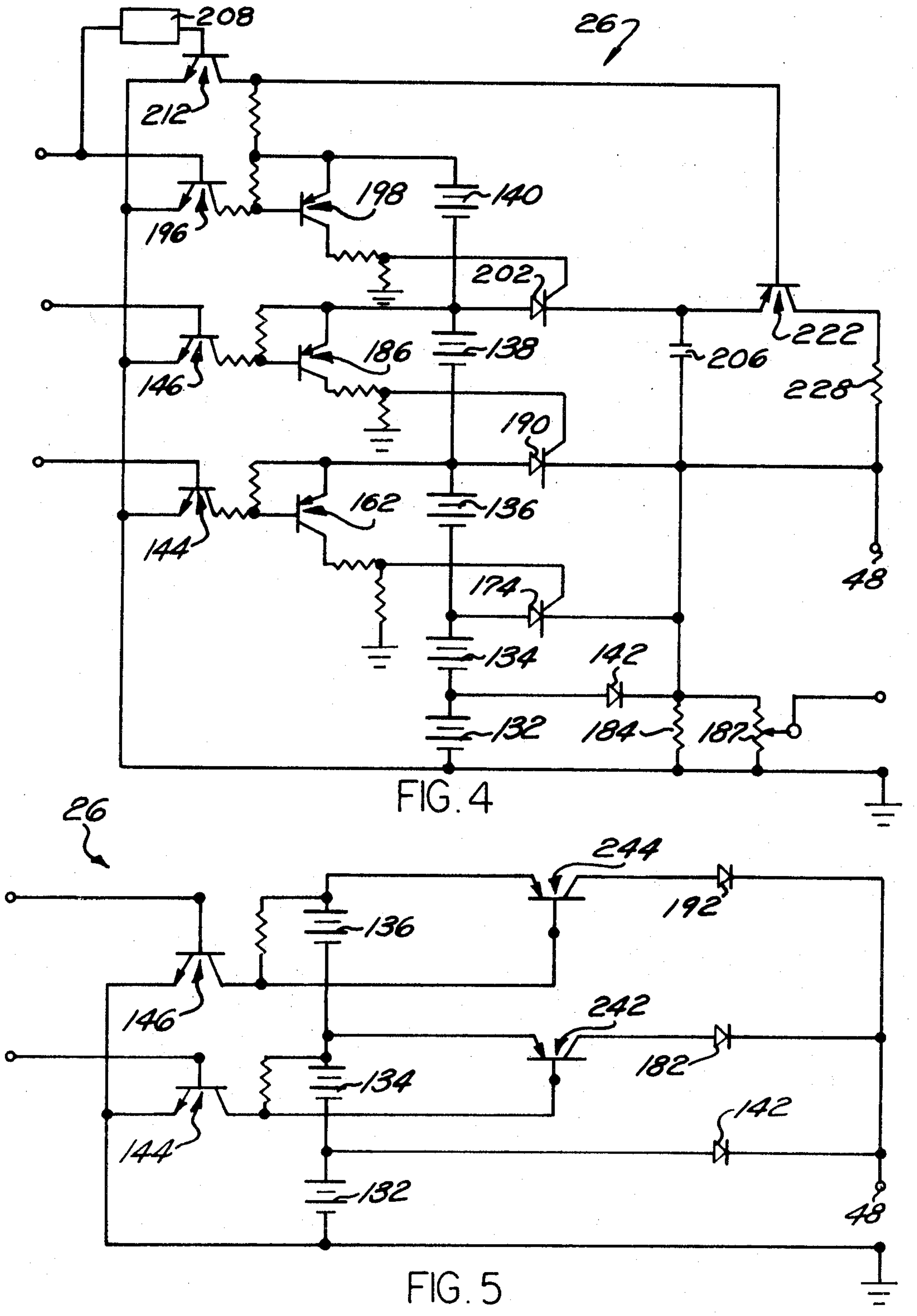
FIG. 4 is a schematic diagram of an embodiment of the voltage switching circuit of the power control system of FIG. 1 which employs controlled rectifiers.
FIG. 5 is an alternative embodiment of the voltage switching circuit of the power control system of FIG. 1 which employs transistors.

One embodiment of switching circuit 26 is shown in the schematic diagram of FIG. 4 in which silicon controlled rectifiers are employed for switching power supply voltages to amplifier 29. FIG. 5 shows an alternate embodiment in which power transistors are employed for switching the power supply voltages.

In the embodiment of FIG. 4, a plurality of power or voltage sources, 132, 134, and 136, provide three different supply voltages for amplifier 29. Two additional voltage sources, 138 and 140, are provided for switching silicon controlled rectifiers 174 and 190 which selectively connect the supply voltages for amplifier 29 between terminal 48 and ground. It will be appreciated that a parallel rather than a series arrangement may be used to provide the several voltages desired for this application. An additional silicon controlled rectifier 202 is provided for switching silicon controlled rectifiers 174 and 190 to the off state. When the analog error signal is less than the first quantized level the controlled rectifiers 202, 190, and 174 are turned off and the first or lowest voltage supply 132 is coupled through a diode 142 to terminal 48. A fixed resistor 184 and a potentiometer 187 are coupled in parallel across terminal 48 and ground. Resistor 184 provides a minimum load on the power supply and the wiper of potentiometer 187 produces a signal which is representative of the voltage that is applied across terminal 48 and ground to the bridge amplifier.

If the magnitude of the analog error signal exceeds the first quantized level but is below the second quantized level, a positive polarity switching signal is produced at the junction point 89 of FIG. 3. This signal is coupled to the base of NPN transistor 144 to bias transistor 144 into conduction and thereby biasing PNP transistor 162 into conduction. The transistor 162 has its emitter coupled to the positive terminal of power supply 136 and its collector coupled to the gate of controlled rectifier 174. Therefore, when transistor 162 is turned on power supply 136 will be coupled through the collector-emitter path of transistor 162 to the gate of controlled rectifier 174, thereby turning on controlled rectifier 174. When controlled rectifier 174 is on, the voltage from voltage supply 134 is coupled through the anode-cathode path of the controlled rectifier 174 to terminal 48. The diode 142 is then reverse biased and the voltage which appears across terminal 48 and ground is the sum of the voltages of the power supplies 138 and 140.

In a like manner, when the magnitude of the analog error signal exceeds the second quantized level, the transistor 146 is turned on by the switching signal at junction 91, causing the transistor 186 to supply the voltage of voltage supply 138 to the gate of controlled rectifier 190 to turn on controlled rectifier 190. The voltage from the power supply 136 is then coupled through the anode-cathode path of controlled rectifier 190 to terminal 48. Controlled rectifier 174 and diode 142 are reverse biased and the voltage which appears across terminals 48 and ground is then the sum of the voltages of the power supplies 132, 134, and 136.

When the voltage that is supplied across the terminals 48 and ground has a magnitude which is greater by a predetermined amount than the voltage that is necessary to deliver current to drive the servo motor 10 at the desired speed, then it is desirable to reduce the supply voltage delivered across terminals 48 and ground. However, once a controlled rectifier has been triggered on, the gate loses control and the anode-cathode current must be reduced below a certain value in order to turn off the controlled rectifier. One method of accomplishing this is to momentarily reverse-bias the anode-cathode circuit of the controlled rectifier.

In the circuit of FIG. 4, the controlled rectifiers 174 and 190 may be reverse biased by momentarily triggering transistor 196 to conduct. This is accomplished by applying a timed pulse to the base of transistor 196 which in turn biases transistor 198 into conduction so that the positive voltage from power supply 140 is coupled through transistor 198 to the gate of controlled rectifier 202 to trigger on the controlled rectifier 202. When the controlled rectifier 202 is conducting, positive voltage from power supply 138 is coupled through the anode-cathode path of controlled rectifier 202 to the capacitor 206. The capacitor 206 is initially discharged and, therefore, initially presents a short circuit between the cathodes of the controlled rectifiers 202 and 190, bringing the potential at terminal 48 to a value equal to the sum of voltage sources 132, 134, 136, and 138. Thus, the controlled rectifiers 190 and 174 and diode 142 will initially be reverse biased and any current flowing through the anode-cathode paths of either of the controlled rectifiers 174 or 190 will be interrupted, thereby turning off the conducting controlled rectifier. When the capacitor 206 is charged to the voltage of the voltage supply 134 an appropriate lower potential voltage supply may then be switched across terminal 48 and ground according to the magnitude of the analog error signal at the time.

The timed pulse signal which is applied to the base of the transistor 196 is also coupled to a one-shot multivibrator 208, the output of which is coupled to the base of an NPN transistor 212. The one-shot multivibrator 208 is constructed to be triggered on by the trailing edge of the timed pulse signal applied to the base of transistor 196 so that transistor 212 will not be turned on until after the controlled rectifier 202 has been conducting a sufficient time to charge capacitor 206. Transistor 212 stays turned on for a predetermined time, as determined by the width of the pulse from the one-shot multivibrator 208. PNP transistor 222 has its base connected to the collector of transistor 212, and is biased into conduction when transistor 212 is conducting, thereby discharging the capacitor 206 through transistor 222 and the resistor 228. When one-shot multivibrator 208 returns to off, control of the voltage switching circuit 26 is again dependent upon the state of the switching signals at junctions 89 and 91.

The timed pulse applied to the base of transistor 126 and to one-shot multivibrator 208 is produced by another one-shot multivibrator 137 which, with reference to FIG. 3, operates as follows. The switching signals which appear on the junction points 89 and 91 are inverted by inverters 93 and 95 respectively and coupled to the bases of NPN transistors 98 and 108 respectively. Therefore, when the signal at junction 89 is negative, the output of inverter 93 is positive and transistor 98 is biased into conduction. When the signal at junction 89 is positive, the output of inverter 93 is negative and transistor 98 is biased to cutoff.

Current is provided to a summing junction 132 at the inverting input of an operational amplifier 134 by way of three circuit paths from terminal 130, which is coupled to a positive potential supply. The first circuit path includes a variable resistor 112, a fixed resistor 100, and a diode 122. The second circuit path includes a variable resistor 116, a fixed resistor 102, and a diode 124. The third circuit path includes a variable resistor 120, a fixed resistor 104, and a diode 126. The collector of transistor 98 is connected between resistor 102 and diode 124. The collector of transistor 108 is connected between resistor 104 and diode 126. The emitters of both transistors 98 and 108 are connected to ground. The operational amplifier 134 has a feedback resistor 140 coupled between its output and its inverting input terminals. Also connected to the inverting input terminal of amplifier 134 is an adjustable bias source 138. The resistances of the three current paths between terminal 130 and junction 132, and the resistances of bias source 138 and feedback resistor 140 are chosen so that operational amplifier 134 operates as a level detector, that is, in a manner similar to operational amplifiers 58, 60, 62 and 64.

When the analog error signal is smaller than the first quantized level, both transistors 98 and 108 are biased into conduction, and act like closed switches, preventing any current from flowing through diodes 124 or 126 to summing junction 132. When the error signal level exceeds the first quantized level but is less than the second quantized level, transistor 98 is biased to cutoff permitting current to flow through diode 124 to summing junction 132. When the error signal level exceeds the second quantized level, transistor 108 is biased to cutoff, permitting current to flow through diode 126 to summing junction 132. The output of operational amplifier 134 is a function of the current input to both its noninverting and inverting inputs. The current to the inverting input is, as described above, a function of the quantized level of the analog error signal. The input to the noninverting input is a function of the actual voltage being supplied to amplifier 29 and is derived from the wiper contact of potentiometer 187 and connected to operational amplifier 134 through resistor 142. The bias source 138 and potentiometer 187 are adjusted so that the output of operational amplifier 134 will be positive whenever the actual voltage being supplied to amplifier 29 exceeds the voltage necessary to provide driving current to the servo motor and will be negative at all other times. The output of amplifier 134 is connected to one-shot multivibrator 137 which provides the timed pulse that is connected to transistor 196 and one-shot multivibrator 208.

An alternative method of turning off the controlled rectifiers 174 and 190 may be constructed by removing the one-shot multivibrator 208, the transistors 212 and 222 and associated resistors, the resistor 228 and the capacitor 206, the power supplies 138 and 140, controlled rectifier 202 and diode 204. A pair of NPN transistors may then be connected with their collector-emitter paths connected across the base-emitter junctions of the transistors 32 and 36 of FIG. 2. The base terminals of these NPN transistors would be connected to the output of one-shot multivibrator 137. With this arrangement, when the NPN transistors are turned on by the timed pulse from one-shot multivibrator 137, they short out the base-emitter junctions of transistors 32 and 36, thereby biasing to cutoff the emitter-collector paths of transistors 32 and 36 to momentarily interrupt the driving current and as a result cause the conducting controlled rectifier, 174 or 190, to turn off.

Other methods of turning off the controlled rectifiers 190 and 174 of the circuit of FIG. 4 when they are conducting will be apparent to those skilled in the art within the scope of the present invention. It is understood that although only the controlled rectifiers 190 and 174 and voltage supplies 132, 134, and 136 are shown in FIG. 4 that any number of additional controlled rectifiers and corresponding voltage supplies may be similarly coupled to achieve a greater number of quantized levels, if desired.

The circuit of FIG. 5 operates in a manner which is similar to the operation of FIG. 4 with power transistors 242 and 244 substituted in the place of the controlled rectifiers of FIG. 4 in order to obtain the desired voltage supply switching. Diodes 182 and 192 prevent transistors 242 and 244 from being reverse biased. To aid in the disclosure, the NPN transistors 144 and 146 and their associated resistors, the voltage supplies 132, 134, and 136 correspond to the same circuit elements as shown in FIG. 4.

In the embodiment of FIG. 5 when the NPN transistor 242 or the NPN transistor 244 is switched on the voltage from the positive terminal of the power supply 134 or the positive terminal of the power supply 136 will be coupled through the collector-emitter path of the respective power transistor 242 or 244 and the associated diode 182 or 192, thereby reverse biasing the diode 142. If the transistor 244 is turned on the diode 182 will also be reverse biased. It is not necessary to provide the portion of the level detecting circuit of FIG. 3 that is located to the right of line A—A when the circuit of FIG. 5 is used since the power transistors 242 and 244 may be turned off merely by biasing them to cutoff.

While two embodiments of the present invention have been particularly described it will be apparent to those skilled in the art that various modifications and changes in details may be made without departing from the scope of the present invention.

What is claimed is:

1. A control system for a motor drive wherein the motor drives a load to a desired state under the control of an error signal having a magnitude which is a function of the difference between the desired state of the load and the present state of the load, comprising electrical drive means for driving said motor, said electrical drive means comprising means for providing a maximum power in response to an error signal and dissipating power to provide less than the maximum power to the load in response to said error signal, the maximum power which said drive means is capable of supplying to said load in response to an error signal being determined by the magnitude of the supply voltage for said drive means, and means for changing the magnitude of the supply voltage of said drive means as a direct function of the magnitude of the error signal so that said maximum power tracks said error signal, and increases when said error signal increases and decreases when said error signal decreases.

2. A control system as defined in claim 1 wherein the span of magnitudes of said error signal comprises a plurality of ranges of magnitudes, and said means for changing the magnitude of the supply voltage comprises a plurality of voltage supplies, and a plurality of energizable switching means each for closing a circuit path from a voltage supply of the plurality of voltage supplies to said drive means in order to couple a predetermined supply voltage to said drive means, each of said switching means being energized in accordance with a predetermined one of said ranges of said error signal.

3. A control system for a motor drive wherein the motor drives a load to a desired state under the control of an error signal having a magnitude which is a function of the difference between the desired state of the load and the present state of the load, comprising electrical drive means for driving said motor, the maximum power which said drive means is capable of supplying to said load in response to an error signal being limited by the magnitude of the supply voltage for said drive means, and means for changing the magnitude of the supply voltage of said drive means as a direct function of the magnitude of the error signal, wherein the control system further comprises a plurality of voltage supplies, a plurality of energizable switching means each for closing a circuit path from a voltage supply of the plurality of voltage supplies to said drive means in order to couple a predetermined supply voltage to said drive means, each of said switching means being energized in accordance with a predetermined magnitude level of said error signal, wherein the error signal is an analog error signal and an analog-to-digital converter produces a plurality of digital control signals each of which is representative of a predetermined range of magnitudes of the analog error signal for controlling said means for changing the supply voltage to said drive means.

4. A control system as defined in claim 3 wherein said means for changing the supply voltage to said drive means comprises a plurality of diodes and a plurality of transistors, each transistor having its collector-emitter path coupled in series with a diode between one terminal of an associated voltage supply and a supply terminal of said drive means, and each diode is reverse biased when a transistor associated with a higher magnitude supply voltage is energized.

5. A control system as defined in claim 3 wherein said means for changing the supply voltage to said drive means comprises a plurality of controlled-rectifiers each of which has its anode-cathode path coupled between one terminal of an associated voltage supply and a supply terminal of said drive means particular controlled rectifiers of the plurality of controlled rectifiers being reverse biased when any controlled-rectifier associated with a higher magnitude supply voltage is energized.

6. A control system as defined in claim 5 further comprising means constructed to produce an output signal when the difference between a signal representing the voltage which is being supplied to said drive means and a signal representing the error signal exceeds a predetermined magnitude and means responsive to the output signal for interrupting the anode-cathode current path of conducting controlled-rectifiers.

7. A control system for a motor drive wherein the motor drives a load to a desired state under the control of an error signal indicating a difference between the desired state and the present state of the load comprising electrical drive means for driving said motor, said electrical drive means comprising power supply means and error signal responsive means energized by said power supply means for supplying power in dependency on said error signal and limited by the voltage of said power supply means, and means for changing the magnitude of the supply voltage of said drive means as a function of the magnitude of the error signal, said error signal being an analog error signal, and an analog to digital converter for providing a plurality of digital control signals each of which is representative of a predetermined range of magnitudes of the analog error signal for controlling said means for changing the supply voltage to said drive means.

8. A control system for a load supply in which current is supplied to the load in response to the input signal comprising a voltage supply, electrical supply means energized by said voltage supply for supplying said current to said load which is limited by the magnitude of the supply voltage of said electrical supply means, means for changing the magnitude of the supply voltage of said supply means as a function of the magnitude of the input signal, said input signal being an analog driving signal, and an analog to digital converter providing a plurality of digital control signals, each of which is representative of a predetermined range of the magnitudes of the analog driving signal for controlling said means for changing the supply voltage to said electrical supply means.

9. A control system as defined in claim 8 wherein said means for changing the supply voltage to said supply means comprises a plurality of diodes, and a plurality of transistors each transistor having its collector-emitter path coupled in series with a diode between one terminal of an associated voltage supply and a supply terminal of said supply means, and each diode is reverse biased when a transistor associated with a higher magnitude supply voltage is energized.

10. A control system as defined in claim 8 wherein said means for changing the supply voltage to said supply means comprises a plurality of controlled-rectifiers, each of which has its anode-cathode path coupled between one terminal of an associated voltage supply and a supply terminal of said supply means, particular controlled-rectifiers of the plurality of controlled rectifiers being reverse biased when any controlled-rectifier associated with a higher magnitude supply voltage is energized.

11. A control system as defined in claim 10 further comprising means constructed to produce an output signal when the difference between a signal representing the voltage which is being supplied to said supply means and a signal representing the input signal exceeds a predetermined magnitude and means responsive to the output signal for interrupting the anode-cathode current path of conducting controlled-rectifiers.

12. A control system for a load supply in which current is supplied to the load in response to the input signal comprising a voltage supply, electrical supply means energized by said voltage supply for supplying said current to said load which is limited by the magnitude of the supply voltage of said electrical supply means, means for changing the magnitude of the supply voltage of said supply means as a function of the magnitude of the input signal, a plurality of voltage supplies, a plurality of energizable switching means each for closing a circuit path from a voltage supply of the plurality of voltage supplies to the electrical supply means in order to couple a predetermined supply voltage to said supply means, each of said switching means being energized in accordance with a predetermined magnitude level of said input signal, said input signal being an analog signal and an analog-to-digital converter produces a plurality of digital control signals each of which is representative of a predetermined range of magnitudes of the analog input signal for controlling said means for changing the supply voltage to said supply means.

13. In a servo motor system, a motor to be energized in accordance with the magnitude of an error signal including electrical circuit means for energizing said motor in response to said error signal to vary the speed thereof in accordance with the magnitude of said signal, said electrical circuit means including power control means for determining the maximum power which said electrical circuit means is capable of delivering and dissipating power to provide less than the maximum power to the load in response to an error signal, and means for actuating said power control means in response to the magnitude of said error signal to change the maximum power capability of said electrical circuit means as a direct function of said error signal.

14. A servo system as defined in claim 13 wherein said electrical circuit means is a power amplifier and said power control means comprises a power supply for said amplifier and means for changing the magnitude of the power supply for said amplifier.

15. A servo system as defined in claim 14 wherein said motor is a direct current motor and said direct current amplifier supplies armature current to said motor.

16. A control system for a load in which electrical power is to be supplied to the load in accordance with the magnitude of a variable input signal comprising a direct current power amplifier for supplying current to said load in response to an error signal and limited by the magnitude of the power capability of said amplifier and dissipating power to provide less than the maximum power to the load in response to said error signal, and means for switching the magnitude of the power capability of said amplifier as a direct function of the magnitude of the input signal.

17. In a control system, a power supply having output terminals, and comprising power control means actuatable to different states to control the power available at said output terminals, a load, dissipative circuit means of variable conductivity, means connecting said load and circuit means in series across said terminals to energize said load in dependency on the conductivity of said circuit means, said circuit means comprising means responsive to a control signal for varying the conductivity of said circuit means for controlling the energization of the load, and additional means responsive to said control signal to actuate said power control means to change the power available at said terminals in direct dependence on the magnitude of said control signal.

18. A control system as defined in claim 17 wherein said power supply comprises a plurality of voltage supplies for supplying different voltages, and said power control means comprises switching means for connecting said voltage supplies to selectively provide different voltages at said output terminals.

19. In a control system, a power supply having output terminals, and comprising power control means actuatable to different states to control the power available at said output terminals, a load, circuit means of variable conductivity, means connecting said load and circuit means in series across said terminals to energize said load in dependency on the conductivity of said circuit means, said circuit means comprising means responsive to a control signal for varying the conductivity of said circuit means for controlling the energization of the load, and additional means responsive to said control signal to actuate said power control means to change the power available at said terminals in direct dependence on the magnitude of said control signal, said power supply comprising a plurality of voltage supplies for supplying different voltages, and said power control means comprising switching means for connecting said voltage supplies to selectively provide different voltages at said output terminals, said additional means comprising an analog-to-digital converter for providing digital signals representing ranges of magnitude of said input signal for actuating said switching means.

20. A control system for a motor drive wherein the motor drives a load to a desired condition under the control of an error signal having a magnitude which is a function of the difference between the desired condition of the load and the present condition of the load, comprising electrical drive means for driving said motor, said electrical drive means having a plurality of states and a maximum available power in each state with said maximum available power being different for different states, said electrical drive means including means responsive to said error signal for delivering a portion of said maximum available power in a given state to said load as a function of the magnitude of said error signal, state-switching means for switching said drive means between said states, and switch control means responsive to the range of magnitude of said error signal to switch said drive means between said states to increase maximum power available to said load as said error signal changes ranges by reaching predetermined magnitudes.

* * * * *